United States Patent
Vidra

(10) Patent No.: US 9,542,475 B2
(45) Date of Patent: Jan. 10, 2017

(54) PRESENTING CONTENT IN ACCORDANCE WITH A PLACEMENT DESIGNATION

(71) Applicant: Google Inc., Mountain View, CA (US)

(72) Inventor: Ezequiel Vidra, London (GB)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/095,656

(22) Filed: Apr. 11, 2016

(65) Prior Publication Data

US 2016/0224661 A1   Aug. 4, 2016

Related U.S. Application Data

(63) Continuation of application No. 13/781,481, filed on Feb. 28, 2013, now Pat. No. 9,336,285.

(30) Foreign Application Priority Data

Mar. 1, 2012   (IL) .......................................... 218419

(51) Int. Cl.
    *G06F 17/30*   (2006.01)
    *G06F 7/00*    (2006.01)
    *G06Q 30/02*   (2012.01)

(52) U.S. Cl.
    CPC ... *G06F 17/30651* (2013.01); *G06F 17/30554* (2013.01); *G06F 17/30643* (2013.01); *G06Q 30/0256* (2013.01)

(58) Field of Classification Search
    CPC ..................... G06F 17/30554; G06Q 30/0256
    See application file for complete search history.

(56) References Cited

U.S. PATENT DOCUMENTS

| | | |
|---|---|---|
| 2006/0013487 A1 | 1/2006 | Longe et al. |
| 2006/0026013 A1* | 2/2006 | Kraft ..................... G06Q 10/10 705/1.1 |
| 2007/0130002 A1 | 6/2007 | Moran et al. |
| 2007/0255693 A1 | 11/2007 | Ramaswamy et al. |
| 2007/0260508 A1 | 11/2007 | Barry et al. |
| 2007/0276800 A1 | 11/2007 | Lee |
| 2008/0109401 A1 | 5/2008 | Sareen et al. |
| 2009/0119259 A1 | 5/2009 | Williams et al. |
| 2011/0047026 A1 | 2/2011 | Biggs et al. |
| 2011/0071899 A1 | 3/2011 | Robertson et al. |
| 2012/0047016 A1 | 2/2012 | Yu et al. |

(Continued)

OTHER PUBLICATIONS

PredictAd "Add a search completion add-on to your toolbar or software" [online] Retrieved from the Internet: http://www.predictad.com/home/SoftwareAndUserApplication.aspx [retrieved on Aug. 27, 2012] 2 pages.

(Continued)

*Primary Examiner* — Taelor Kim
(74) *Attorney, Agent, or Firm* — Fish & Richardson P.C.

(57) ABSTRACT

Methods, systems, and computer program products are provided for presenting content in accordance with a placement designation. One example method includes identifying terms associated with a campaign, the campaign having an associated content item that is presented to users responsive to requests for content, receiving an indication of a placement designation including targeting criteria for presenting the content item in a search suggestion control along with search suggestions, storing information associated with the campaign, and processing content requests.

20 Claims, 6 Drawing Sheets

(56) References Cited

U.S. PATENT DOCUMENTS

2012/0209722 A1 8/2012 Plut

OTHER PUBLICATIONS

PredictAd "Publisher Signup" [online] Retrieved from the Internet: http://www.predictad.com/home/PublisherSignup.aspx [retrieved on Aug. 27, 2012] 2 pages.

PredictAd "Search completion tool for your site search" [online] Retrieved from the Internet: http://www.predictad.com/home/publisherinfo.aspx [retrieved on Aug. 27, 2012] 2 pages.

PredictAd "PredictAd-Enhance search, Spread your content and get powerful analytics for your web" [online] Retrieved from the Internet: http://www.predictad.com/home/default.aspx [retrieved on Aug. 27, 2012] 2 pages.

PredictAd "Start Advertising" [online] Retrieved from the Internet: http://www.predictad.com/home/AdvertiserSignup.aspx [retrieved on Aug. 27, 2012] 2 pages.

PredictAd "Advertise with PredictAd" [online] Retrieved from the Internet: http://www.predictad.com/home/AdvertiserInfo.aspx [retrieved on Aug. 27, 2012] 2 pages.

Collarity—Optimized audience Engagement—Screenshots, "Content Recommendation Screenshots," Retrieved from the Internet: http://www.collarity.com/resources/screenshots.html [retrieved on Aug. 27, 2012] 1 page.

Collarity—Optimized audience Engagement—Screenshots, "Content Syndication Screenshots," Retrieved from the Internet: http://www.collarity.com/resources/screenshots.html [retrieved on Aug. 27, 2012] 1 page.

Collarity—Optimized audience Engagement—Screenshots, "Search Service Screenshots," Retrieved from the Internet: http://www.collarity.com/resources/screenshots.html [retrieved on Aug. 27, 2012] 1 page.

Collarity—Optimized audience Engagement—Screenshots, "Site Segment Analytics Screenshots," Retrieved from the Internet: http://www.collarity.com/resources/screenshots.html [retrieved on Aug. 27, 2012] 1 page.

* cited by examiner

PRESENTING CONTENT IN ACCORDANCE WITH A PLACEMENT DESIGNATION

CROSS-REFERENCE TO RELATED APPLICATIONS

Pursuant to 35 U.S.C. §119, this application claims the benefit of a foreign priority of Israel Patent Application No. 218419, filed Mar. 1, 2012, whose disclosure content is hereby incorporated by reference in its entirety.

BACKGROUND

This specification generally relates to information presentation.

Users can employ Internet-based search engine interfaces to provide search queries and to receive query results. Content providers can target specific search query keywords, and can sponsor content to be provided to users along with the query results. Some search engines may include predictive capabilities for presenting users with query suggestions, based on characters entered in a search box.

SUMMARY

In general, one innovative aspect of the subject matter described in this specification may be embodied in methods, systems, and computer program products for presenting content in accordance with a placement designation. One example method includes identifying terms associated with a campaign, the campaign having an associated content item that is presented to users responsive to requests for content, receiving an indication of a placement designation including targeting criteria for presenting the content item in a search suggestion control along with search suggestions, storing information associated with the campaign, and processing content requests.

Processing content requests can include evaluating a received search string, identifying one or more query suggestions, determining if the query suggestions match the one or more terms associated with the campaign, and presenting the content item in response to the received search string along with the one or more query suggestions. Processing content requests can include evaluating a received search string and one or more query suggestions, determining if the search string or the query suggestions match the one or more terms associated with the campaign, and presenting the content item in response to the received search string along with the one or more query suggestions.

In general, another innovative aspect of the subject matter described in this specification may be embodied in computer program products that can perform operations including identifying terms associated with a campaign, the campaign having an associated content item that is presented to users responsive to requests for content, receiving an indication of a placement designation including targeting criteria for presenting the content item in a search suggestion control along with search suggestions, storing information associated with the campaign, and processing content requests.

In general, another innovative aspect of the subject matter described in this specification may be embodied in content management systems for serving sponsored content to users. The systems can include term identifiers, designation receivers, campaign data stores, and content request processors. A term identifier can identify one or more terms associated with a campaign, the campaign having an associated content item that is presented to users responsive to requests for content. A designation receiver can receive an indication of a placement designation including targeting criteria for the presentation of a content item. The targeting criteria can include a designation for presenting the content item in a search suggestion control along with search suggestions. A campaign data store can store information associated with the campaign. A content request processor can process content requests, including evaluating a received search string, identifying one or more query suggestions, determining if the query suggestions match the one or more terms associated with the campaign, and presenting the content item in response to the received search string along with the one or more query suggestions.

These and other embodiments may each optionally include none, one or more of the following features. The terms can include one or more prefixes. The prefixes can include the first one or more letters of the terms. A control can be presented to a campaign sponsor to enable selection of the placement designation. Presenting the control can include presenting an option to allow for specification of presentation only in a search suggestion control. Presenting the control can include presenting an option to allow for specification of presentation in either a search suggestion control or as part of search results submitted to a user. A bid can be received from a campaign sponsor, the bid can be associated with the one or more terms, and an auction can be run. The content item can be presented in accordance with one or more auction winners one innovative aspect of the subject matter described in this specification may be embodied in methods, systems, and computer program products for presenting content items in accordance with a received placement designation.

Particular embodiments of the subject matter described in this specification may be implemented to realize none, one or more of the following advantages. Campaign sponsors may employ online interfaces to evaluate various targeting options regarding partial keyword forms, and to make appropriate targeting decisions based on the circumstances of their particular campaigns. Campaign sponsors may increase their potential exposure to users. System users may receive sponsored content suggestions based on the submission of a minimal number of keystrokes, or a single keystroke, improving system response times and content relevance for users.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In general, computer systems can provide targeted content based on receipt of content requests. Users can interact with a search engine interface (e.g., a web page) to provide queries via a search control (e.g., a search box). Search disambiguation may occur as the user types his or her query, for example, by presenting the user with query completion options within a search suggestions control (e.g., a search suggestions box). In addition to providing query completion options, one or more content items (e.g., advertisements) may be provided in the search suggestions control. Campaign sponsors (e.g., advertisers) may be given the option to target content items for presentation in search suggestion controls to users, based on partial term forms, or prefixes, provided by users.

Figure 1:
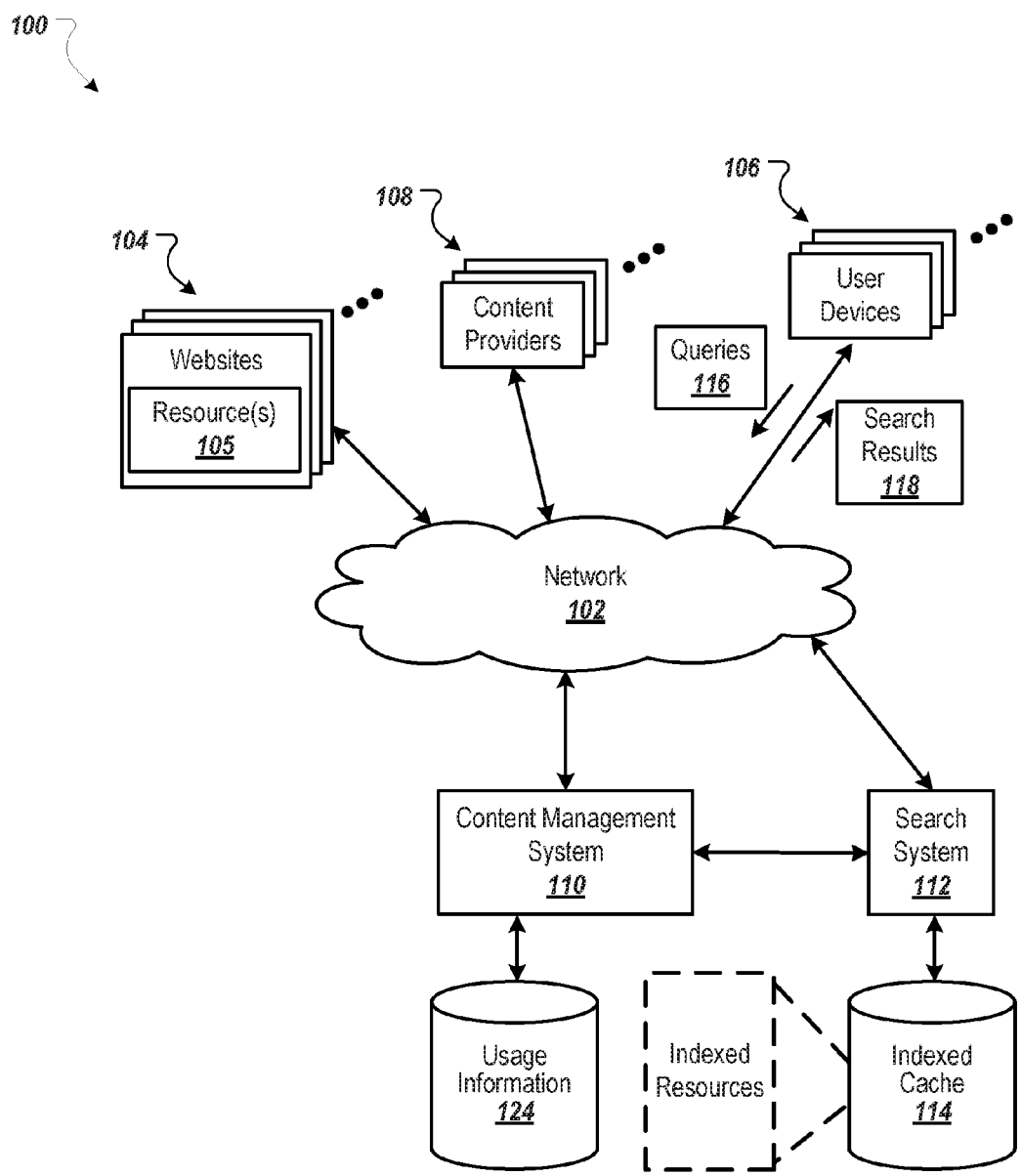
FIG. 1 is a block diagram of an example environment for presenting content to users in response to requests for content.

FIG. 1 is a block diagram of an example environment 100 for providing content to users in response to requests for content. The example environment 100 includes a network 102, such as a local area network (LAN), a wide area network (WAN), the Internet, or a combination thereof. The network 102 connects websites 104, user devices 106, content providers 108 (e.g., advertisers), publishers, and a content management system 110. The example environment 100 may include many thousands of websites 104, user devices 106, and content providers 108. The content management system 110 may be used for selecting and providing content in response to requests for content.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 112 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 112 over the network 102. A request for a resource 105 or a search query 116 sent from a user device 106 can include an identifier, such as a cookie, identifying the user of the user device 106.

In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The content information system 110 can update usage information 124 for a user, based on activity of the user, subject to the user's express permission. For example, the user may receive notice of what data may be collected and how such data may be used or retained, and may be provided with an opportunity to opt in/out of programs that may collect personalized information. In addition, certain data may be anonymized in one or more ways before it is stored or used, so that personally identifiable data is removed. The usage information 124 can include, for example, information about past user activities, such as past requests for resources 105, past search queries 116, other requests for content, websites visited, or interactions with content. In some implementations, the usage information 124 can be derived, for example, from one or more of a query log, an advertisement log, or requests for content. In some implementations, the usage information 124 can include, for each entry, a cookie identifying the user, a timestamp, an IP (Internet Protocol) address associated with a requesting user device 106, a type of usage, and details associated with the usage.

When a resource 105 or search results 118 are requested by a user device 106, the content management system 110 may receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or web page or a designated portion of a user interface associated with a search control, in which content can be presented. An example slot is an ad slot. Search results pages can also include one or more slots in which other content items (e.g., ads) can be presented.

Information about slots can be provided to the content management system 110. For example, a reference (e.g., URL) to the resource for which the slot is defined, a size of the slot, and/or media types that are available for presentation in the slot can be provided to the content management system 110. Similarly, keywords or portions of keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords (or portions of keywords) or search queries 116. As another example, content items having targeting keywords that match the resource keywords (or portions thereof) or the search query 116 are selected as eligible content items by the content management system 110.

A targeting keyword can match a resource keyword or a search query 116 by having the same textual content ("text") as the resource keyword or search query 116. For example, a content item (e.g., an advertisement) associated with the targeting keyword "automobiles" can be an eligible content item (or an eligible ad) for a content item request that includes the resource keyword "automobiles." Similarly, the ad can be selected as an eligible content item for a request including the search query "automobiles." Moreover, partial keyword forms, or "prefixes", may be considered when matching targeting keywords with resource keywords or search queries. For example, a content item associated with a partial form of a targeting keyword (e.g., the letter "a", the partial form "au", the partial form "aut", etc.) can be selected as an eligible content item for a request including similar partial resource keywords or partial search queries.

The content management system 110 can select from the eligible content items that are to be provided for presentation in slots of a resource 105 or search results page 118 based at least in part on results of an auction. For example, for the eligible content items, the content management system 110 can receive bids from content providers 108 (e.g., advertisers) and allocate the slots, based at least in part on the received bids (e.g., based on the highest bidders at the conclusion of the auction). The bids are amounts that the content providers are willing to pay for presentation (or selection) of their content with a resource 105 or search results page 118. For example, a bid can specify an amount that a content provider is willing to pay for each one thousand impressions (i.e., presentations) of the content item, referred to as a CPM bid. Alternatively, the bid can specify an amount that the content provider is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

Figure 2:
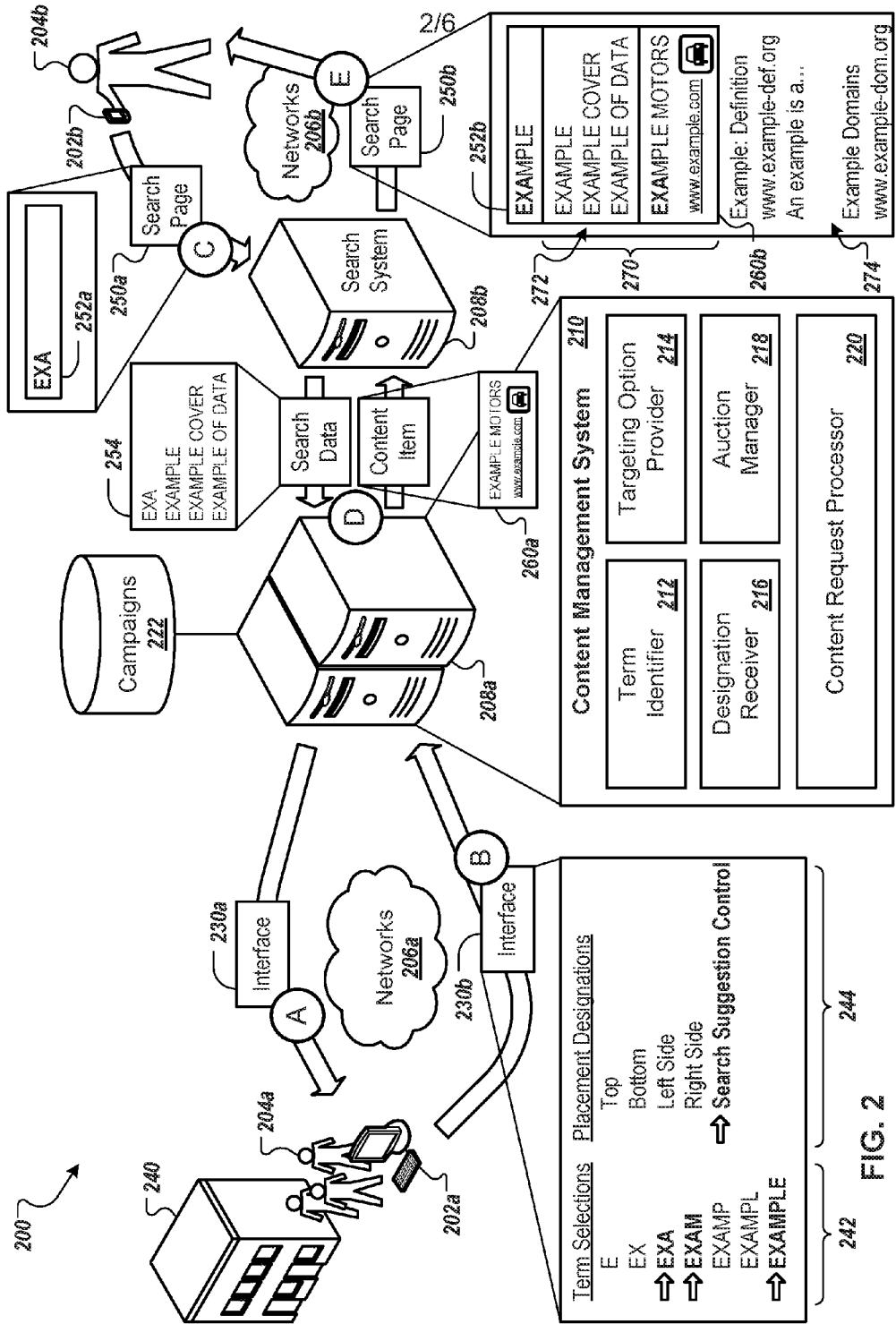
FIG. 2 is a diagram of an example system that can present content to users in accordance with a received placement designation.

FIG. 2 is a diagram of an example system 200 that can present content to users in accordance with a received placement designation. FIG. 2 also illustrates an example flow of data within the system 200 during states (A) to (E), where the states (A) to (E) may occur in the illustrated sequence, or they may occur in a sequence that is different than in the illustrated sequence. For example, two or more of the states (A) to (E) may occur concurrently.

The system 200 can provide suggestions, for instance, as completions in the form of multi-term phrases or dominant queries that are derived from the received user input. For example, a content management system 210 included in the system 200 can evaluate the user input as received and identify one or more completions based on the user input. Based on the completions, one or more associated content items can be identified. Ones of the completions (e.g., popular ones) can be provided as suggestions to the user. The additional content items can be merged with selected ones of the completions and provided for display to the user. The suggestions can be displayed in proximity to or in an augmented form of the control that receives the user input. For example, the suggestions and associated content can be included in a suggestion box that is displayed in proximity to the control (e.g., a search query box). In some implementations ads, navigational links, static content, video content, or other content can be displayed in a suggestion box adjacent to (e.g., directly below) an input control (e.g., a search query box) on the user's computer screen. The suggestions and additional content items can appear on the user's screen in a suggestion box or other form of display element after the user has entered just a portion (e.g., a character, a few characters, etc.) of the query, such as after the input is sufficient to generate useful suggestions. In some implementations, one or more content items are provided along with one or more suggestions for completing the user input. The content items can be included along with the suggestions or presented in a separate augmented form of the control (e.g., an expanded textual input box or drop down box).

For the purposes of this disclosure, the user input received and processed to determine suggestions and related content is referred to herein as a prefix. The prefix can constitute one or more textual characters that are entered by/received from the user. A completion refers to a particular completed request, and can be based on historical processing of other requests. For example, a completion can be of the form of words or phrases that embody the request the user is providing, as evaluated as a portion of that request is entered. In some implementations, the suggestions and/or additional content (e.g., advertisements) returned by the content management system 210 can correspond to content exactly matching the prefix entered by the user. For example, if the user enters "bicyc", the system 200 can generate suggestions and locate additional content items related to the subject of bicycles, such as suggestions for ads for local bicycle shops. In some implementations, the information returned by the content management system 210 can be based on the user's interests, profile information, geographical location, etc. These additional criteria can be combined for use with the user's input in order to provide targeted content.

The system 200 can include one or more client devices 202 (each operated by a corresponding device user 204) that communicate over one or more networks 206 with one or more computing servers 208. The networks 206 may include a wireless cellular network, a wireless local area network (WLAN) or WiFi network, a Third Generation (3G) or Fourth Generation (4G) mobile telecommunications network, an intranet, the Internet, or any other suitable network or any appropriate combination thereof.

The client device(s) 202 may be any suitable type of computing device (e.g., mobile phone, smartphone, personal digital assistant, tablet computer, laptop or desktop computer, or other stationary or portable device) that includes one or more processors and computer readable media. Among other components, for example, the client device(s) 202 includes one or more processors, computer readable media that store software applications, input device(s) (e.g., touch screens, keyboards, computer mice, motion sensors, microphones, etc.), output device(s) (e.g., display screens, speakers, etc.), and communications interfaces.

The computing server(s) 208 may be configured to execute application code associated with a variety of software components (e.g., modules, objects, libraries, services, etc.), including computer instructions to perform some or all of the method steps described below. In some implementations, the computing server 208a may include one or more components of the content management system 210 described below.

The content management system 210 (e.g., similar to the content management system 110, shown in FIG. 1) can identify terms (e.g., keywords) associated with a campaign, can present a campaign sponsor with an option to target one or more content items to users based on receipt of a partial form (e.g., prefix) of one or more terms, and can provide the content items for presentation in search suggestion controls (e.g., suggestion boxes) to users. In the present example, the content management system 210 includes a term identifier 212, a targeting option provider 214, a designation receiver 216, an auction manager 218, and a content request processor 220. Two or more of the components 212, 214, 216, 218, and 220 may be implemented on the same device (e.g., same computing device), or on different devices, such as devices included in a server farm or a peer-to-peer network.

The content management system 210 may be in communication with one or more data stores, servers, and/or other systems. In the present example, the content management system 210 and server(s) 208a communicate with a campaigns data store 222 and the server(s) 208b (e.g., servers for running a search system, similar to the search system 112 shown in FIG. 1). The data store 222, for example, can implement databases, file systems, and the like to add, remove, and maintain data used by the system 200. The server(s) 208b (the search system), for example, can receive search queries from and can provide search results to system users (e.g., the user 204b).

Referring to the example flow of data, during state (A), campaign sponsors can be presented with options to target content items for presentation in search suggestion controls to users. Campaigns, for example, may include actions for reaching users, or particular categories (e.g., based on user demographics, locations, and/or profiles) of users. Campaign sponsors, for example, may include entities (e.g., organizations, individuals, businesses, advertisers) that intend to target content items (e.g., advertisements) to system users (e.g., the user 204b) during one or more campaigns.

In the present example, the content management system 210 can employ the targeting option provider 214 to provide targeting options to the user 204a (e.g., a representative of campaign sponsor 240) via an interface 230 (shown here as interface 230a). The user 204a, for example, may be a representative, agent, and/or employee of campaign sponsor 240 (e.g., "Example Motors", an automobile dealership). The interface 230, for example, may be an online interface (e.g., a web page) provided by the content management system 210, and may include various controls (e.g., output, input, command, etc.) for presenting information to and receiving information from campaign sponsors via networks 206a, to facilitate campaign configuration and management by the sponsors.

During state (B), campaign information can be received from campaign sponsors, including indications of placement designations for the presentation of content items to users. In the present example, to provide campaign information to the content management system 210, the user 204a can employ the client device 202a to interact with the interface 230 (shown here as interface 230b). For example, the user 204a can use the interface 230 to provide campaign information including one or more term selections 242 and one or more placement designations 244 to be used by the content management system 210 when targeting content items to users. Term selections, for example, may include phrases (multiple terms), single terms, and/or partial forms (e.g., prefixes) of one or more terms. In the present example, the term selections 242 selected by the user 204a include the single term "example", and the partial forms "exa" and "exam". Placement designations, for example, may include targeting criteria for the placement of content items (e.g., advertisements) within various interface sections (e.g., at the top, bottom, left side, right side, etc., of a web page) and/or within various interface controls (e.g., within a display slot, within a pop-up display, within a search suggestion control, etc.). In the present example, the placement designations 244 selected by the user 204a include a search suggestion control.

As described in additional examples below (refer to FIG. 3), in some implementations, the interface 230 may also provide options for providing campaign information such as content item text (e.g., headlines, descriptions, etc.), graphics (e.g., icons, favicons, etc.), web links, auction bid values, etc. Upon receiving the term selections 242, placement designations 244, and other campaign information provided by the user 204a, for example, the content management system 210 can employ the term identifier 212 and the designation receiver 216 to associate the campaign information with a campaign of the campaign sponsor 240. For example, the selections 242, the designations 244, and other campaign information may be maintained by the campaigns data store 222, in association with one or more campaign identifiers.

During state (C), system users can submit requests for content. Requests for content, for example, may include search queries, map requests, social network requests, and other sorts of content requests. Requests may be submitted, for example, by providing text (e.g., by typing), sounds (e.g., voice commands), images (e.g., photos, barcodes, quick response codes, etc.), locations (e.g., zip codes, geographic coordinates, etc.) and other suitable data. In the present example, the user 204b can employ the client device 202b to access a search page 250 (shown here as search page 250a) provided by the server(s) 208b (the search system) via networks 206b. Interacting with the search page 250a, for example, the user 204b can enter search text in a search control 252 (shown here as search control 252a). Other examples of providing search controls may include provision via an interface (e.g., a web page, a custom application, etc.) provided the content management system 210, by servers (not shown) associated with an entity (e.g., a syndication partner) affiliated with the content management system 210, or by servers (not shown) of an entity that uses services provided by the server(s) 208b (the search system). In the present example, the user 204b begins entering text (e.g., via keypad), including a prefix (i.e., a sequence of letters) "exa". As the user enters the sequence of letters, for example, the search page 250a can provide the sequence to the server(s) 208b. Upon receiving the sequence, for example, the server(s) 208b (the search system) may provide search data 254 including a search string (e.g., "exa") to the content management system 210. In some implementations, the search data 254 may include one or more query suggestions. For example, based on the prefix "exa", the search system may identify the query suggestions "example", "example cover", "example of data", etc.

During state (D), content requests can be processed. For example, the content management system 210 can employ the content request processor 220 to process a content request for the user 204b, based on the search data 254 provided by the computing server(s) 208b (the search system). Upon receiving the search data 254, for example, the content request processor 220 can evaluate the received search string (e.g., the prefix "exa"), and the query suggestions (e.g., "example", "example cover", "example of data", etc.) generated by the search system to determine if the search string and/or any of the search suggestions match any terms associated with any campaign (e.g., a campaign of the campaign sponsor 240 or that of another campaign sponsor). In the present example, the content request processor 220 may access the campaigns data store 222 and may determine that the received search string "exa" and the query suggestion "example" match one or more term selections 242 provided by the campaign sponsor 240. Thus, in the present example, the content request processor 220 may identify a content item 260 (here shown as content item 260a) associated with the campaign sponsor 240 and may identify one or more placement designations 244 for the content item 260a as indicated by the campaign sponsor. Content items, for example, may include text, images, video, audio, web links, and other types of content specified by the campaign sponsor 240 and/or generated by the content management system 210. Content items may be provided in the form of advertisements, entertainment content, and recommendations (e.g., for products, services, computer applications, etc.), to list a few possible examples. In the present example, the content item 260 includes text (e.g., "Example Motors"), a web link (e.g., www.example.com), and a favicon (e.g., an automobile icon) associated with the campaign sponsor 240. If plural campaigns are identified, for example, then a selection (e.g., an auction or reservation selection) can be made to determine which among the plural eligible items should be delivered.

In some implementations, an auction may be run, and content may be selected in accordance with one or more auction winners. For example, the content management system 210 can employ the auction manager 218 to evaluate bids provided by various campaign sponsors for having content presented to users in response to content requests. Campaign sponsors, for example, may bid on various phrases, terms, and/or prefixes that may be entered by users (or that may be suggested by the search system), and may also bid on various placement designations. During an auction, for example, the auction manager 218 can evaluate bids and associated quality scores for each campaign, and can determine one or more auction winners. Quality scores, for example, may be based on historical click rates of content items, campaigns, and/or campaign sponsors, and other suitable factors.

In some implementations, cached content-completion pairs may provide the basis for retrieving or generating content items. The system 200 can populate and update the content-completion pairs by querying ad mixers (not shown) in the background. For example, completions can be determined based on predictions of the most popular requests (e.g., search queries) received. One or more content items can be associated with each completion, forming pairs that are stored as ad-completion pairs. The actual content items or links thereto can be stored, for example, in the campaigns data store 222. The campaigns data store 222 can include references, for example, to keywords or other information associated with the content items (e.g., advertisements). Content-completion pairs can be indexed by completion, keywords associated with a completion, or other means. Which completions are associated with which content items (and hence mapped in the form of content-completion pairs) can be based on, for example, the frequency of previously performed searches. This provides the advantage of caching matching items that are generally more likely to lead to specific additional content that is useful to the user.

During state (E), content items can be presented to users. For example, the server(s) 208b (the search system) can include the content item 260 (shown here as content item 260b) in a search suggestion control 270 along with one or more search completions 272 (e.g., "example", "example cover", "example of data", etc.). The search suggestion control 270, for example, may be included in the search page 250 (shown here as search page 250b) with search results 274 for presentation to the user 204b via the client device 202b. The search results 274, for example, may include links (e.g., to web pages, documents, or other content sources), pertinent sections of text, content summaries, images, multimedia, maps, ratings, and other suitable information. The server(s) 208b, for example, may provide search results that are relevant to a primary search completion (e.g., "example"), and may update the search control 252 (shown here as search control 252b) to include the completed term(s).

Various embellishments may be provided to facilitate recognition of content items in search suggestion controls. In some implementations, a separation indicator (e.g., a line or another sort of boundary) may be included to provide a distinction between search completions and sponsored content items. Thus, users may readily determine which suggestions are sponsored, for example, and which are not. In some implementations, partial forms may be highlighted in content items when presenting content items to users. For example, the partial form "exa" may be highlighted within the text "Example Motors". Thus, if the user 204b happens to be interested in "Example Motors", for example, he or she may readily identify the entity via the highlighted text, web link, and/or favicon, and may interact with (e.g., click) the content item 260b to navigate his or her web browser to a website associated with the campaign sponsor 240.

Figure 3:
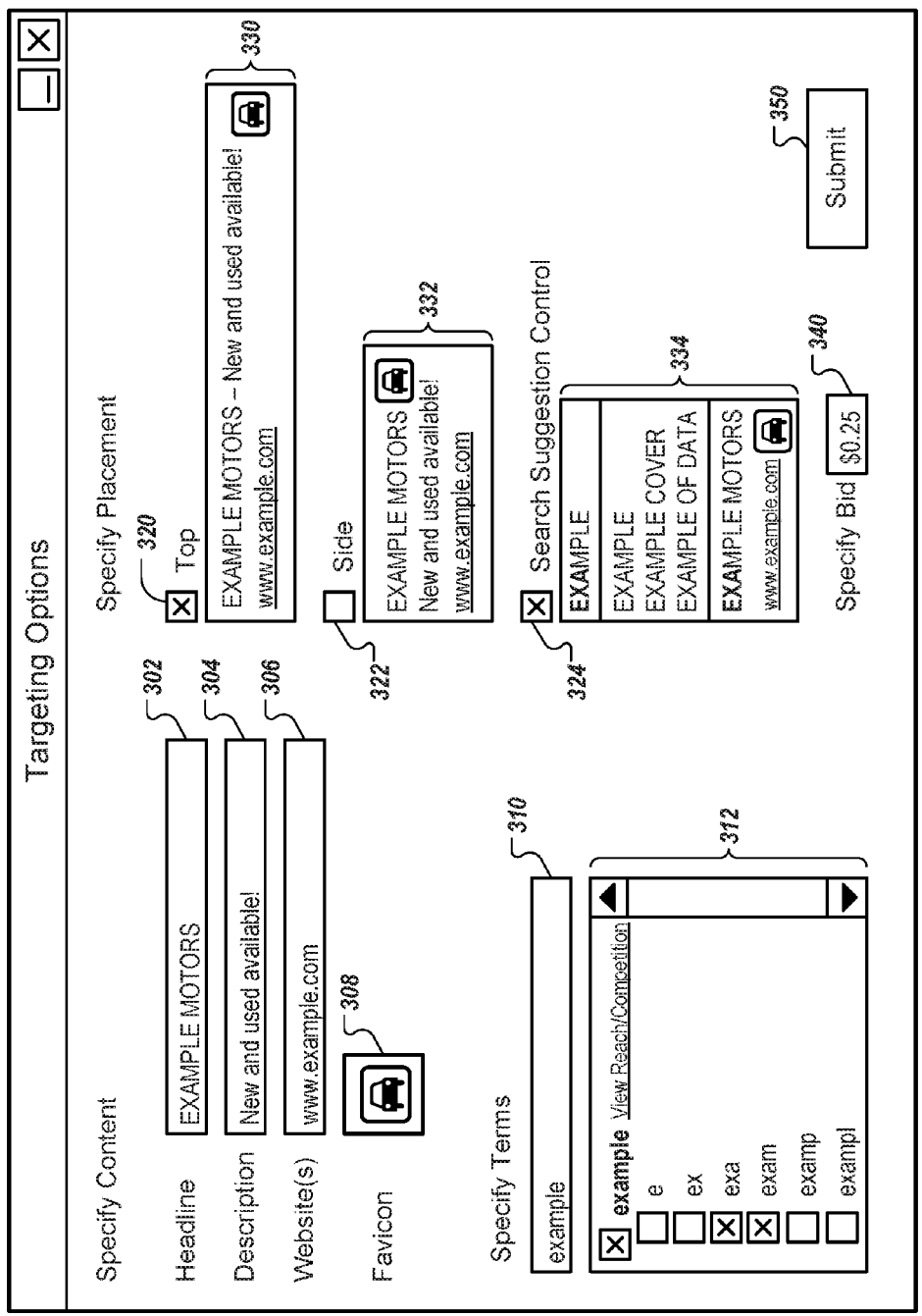
FIG. 3 shows an example user interface for presenting campaign sponsors with options for selecting a placement designation for presentation of a content item to users.

FIG. 3 shows an example user interface 300 for presenting campaign sponsors with options for selecting a placement designation for presentation of a content item to users. For example, the client device 202a (shown in FIG. 2) can execute an application such as a web browser to present to the user 204a (e.g., a representative of campaign sponsor 240) one or more user interfaces, such as the user interface 230 (also shown in FIG. 2) or the user interface 300. By interacting with user interfaces such as the user interface 230, 300, for example, representatives of the campaign sponsor 240 can provide criteria for use in targeting content items to users.

Referring to FIG. 3, the example user interface 300 may include one or more controls for specifying content items (e.g., advertisements) to be presented to users. For example, the user interface 300 may include a control 302 for indicating a headline, a control 304 for indicating a description, a control 306 for indicating a web link, and a control 308 for indicating a favicon to be associated with or included in a content item. In the present example, a representative (e.g., the user 204a) of the campaign sponsor 240 can interact with (e.g., enter a value in) the control 302 to provide the headline "EXAMPLE MOTORS", can interact with the control 304 to provide the description "New and used available!", and can interact with the control 306 to provide the web link "www.example.com". Interacting with the control 308, for example, the representative can provide (e.g., upload) and/or create (e.g., draw) a favicon (e.g., an icon, such as the campaign sponsor's logo) or another sort of graphic.

The example user interface 300 may include one or more controls for specifying terms (e.g., phrases, keywords, keyword prefixes, etc.) associated with a campaign. For example, the user interface 300 may include a control 310 for indicating terms and a control 312 for indicating partial forms (e.g., prefixes) of the terms to be used for targeting content items. In the present example, a representative of the campaign sponsor 240 can interact with (e.g., enter a value in) the control 310 to provide the term "example". Upon receiving the provided term via the interface 300, for example, the content management system 210 can use the term identifier 212 to associate the provided term with the sponsor's campaign (e.g., by updating campaign information maintained by the campaigns data store 222). In some implementations, suggestions for one or more term prefixes may be presented for selection. For example, upon receiving the term "example", the content management system 210 may provide the prefixes "e", "ex", "exa", "exam", "examp", and "exampl" to the campaign sponsor representative for selection via the control 312. In the present example, the user 204a may select the prefixes "exa" and "exam", and the selected prefixes may be associated with the sponsor's campaign.

In some implementations, estimated reach information and competition information may be presented for terms and partial forms (e.g., prefixes) of terms. Based on estimated reach and/or competition information, for example, campaign sponsors may select one or more keywords and/or partial keywords for targeting. When a content item (e.g., an advertisement) is presented to a user, for example, the content management system 210 may identify a content item impression, and if the user selects (e.g., clicks) the content item, the content management system 210 may identify a click-through. In general, partial keyword forms including few letters may be considered as potentially broad matches relative to partial keyword forms with many letters, and thus content items associated with such forms may receive a relatively greater number of impressions. However, in general, partial keyword forms including many letters may be considered as more targeted to user requests than partial keyword forms including few letters, and thus users may be more likely to select content items associated with such forms. In the present example, a representative of the campaign sponsor 240 may interact with (e.g., select via checkbox) the keyword "example", and the partial keyword forms "exa" and "exam", based on a preferable combination of estimated reach information, perceived targeting value, and/or favorable levels of competition.

The example user interface 300 may include one or more controls for specifying placement of content items associated with a campaign. For example, the user interface 300 may include a control 320 for indicating that content items are to be presented within a top portion of a content presentation interface (e.g., a search results page, such as the search page 250 shown in FIG. 2) to system users (e.g., the user 204b). Similarly, for example, the user interface 300 may include a control 322 for indicating that content items are to be presented within a side portion (e.g., a right side or a left side) of the content presentation interface, and a control 324 for indicating that content items are to be presented within a search suggestion control included in the content presentation interface. In the present example, the representative of the campaign sponsor 240 may indicate that content items are to be presented to system users, in either a search suggestion control, or within a top portion of a content presentation interface (e.g., as part of search results submitted in a search page to a user).

In some implementations, content item previews may be provided. For example, the user interface 300 may include a control 330 for providing to a representative of the campaign sponsor 240 a preview of how a specified content item would appear to a system user when presented within a top portion of a content presentation interface. Similarly, the user interface 300 may include a control 332 for providing a preview of how the specified content item would appear to the user when presented within a side portion, and a control 334 for providing a preview of how the content item would appear when presented within a search suggestion control.

The user interface 300, for example, may include one or more controls for specifying information to be used in an auction for having content items presented system users. For example, the user interface 300 may include a control 340 for specifying a bid value. In the present example, the campaign sponsor 240 may interact with the control 340 to indicate a default bid of $0.25 for having content items presented to users in response to receipt of campaign terms (e.g., phrases, keywords, keyword prefixes, etc.), and the content items being placed in one or more of the designated portion(s) of a content presentation interface.

More or fewer controls may be presented to campaign sponsor representatives for providing campaign information, content item specification and/or targeting criteria. For example, an interface for specifying targeting options may include one or more controls for specifying preferred characteristics of targeted individuals, such as demographic characteristics, language, location, and other suitable characteristics. Upon specifying desired targeting options, for example, a representative of the campaign sponsor 240 can interact with (e.g., click) a control 350 to submit information to the content management system 210.

Figure 4:
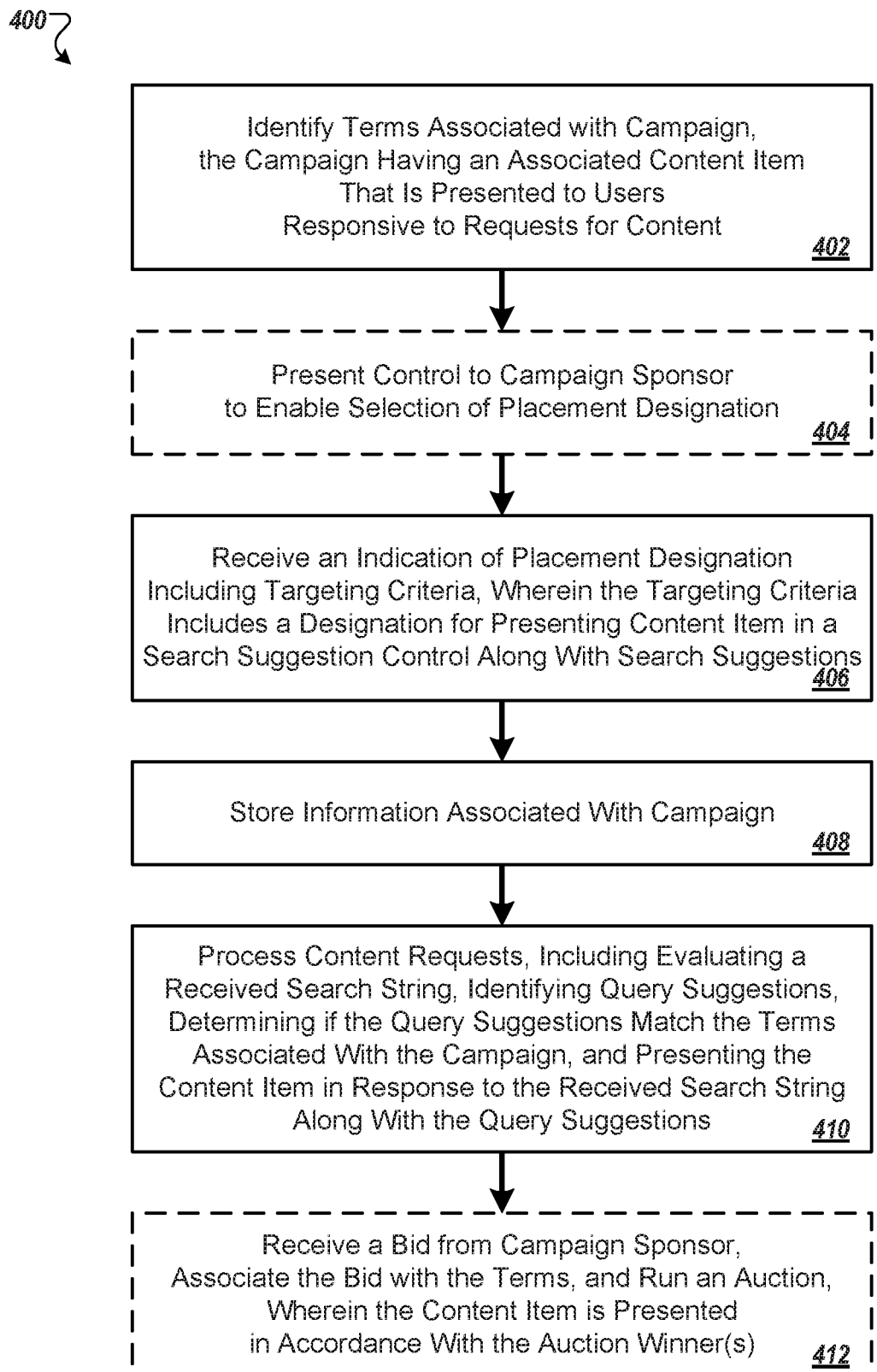
FIGS. 4 and 5 are flowcharts of example processes for presenting content items in accordance with a received placement designation.

FIG. 4 is a flowchart of an example process 400 for presenting content items in accordance with a received placement designation. In some implementations, the process 400 may be performed by the systems 100 and/or 200, and will be described as such for the purpose of clarity. Briefly, the process 400 may include identifying terms associated with a campaign, receiving an indication of a placement designation including targeting criteria, wherein the targeting criteria includes a designation for presenting a content item in a search suggestion control along with search suggestions, storing information associated with the campaign, and processing content requests. Processing requests for content may include evaluating a received search string, identifying query suggestions, determining if the query suggestions match the terms associated with the campaign, and presenting the content item in response to the received search string along with the query suggestions.

One or more terms associated with a campaign can be identified (402). Referring to FIG. 2, for example, the term identifier 212 can identify one or more terms associated with a campaign (e.g., an advertising campaign) of the campaign sponsor 240. For example, the campaign sponsor 240 may be an entity such as an organization, business, or individual. In the present example, the campaign sponsor 240 (e.g., "Example Motors", an automobile dealership) may have an ongoing campaign for presenting content items (e.g., the content item 260a) to users responsive to requests for content (e.g., search strings) provided by users. In some implementations, one or more terms may be received from a campaign sponsor. For example, a representative (e.g., the user 204a) of the campaign sponsor 240 may employ the interface 230b to provide one or more campaign terms to the content management system 210. In some implementations, the one or more terms may include one or more prefixes. Prefixes, for example, may include the first one or more letters of the terms. For example, the campaign sponsor 240 may provide the term "example" and the related prefixes "exa" and "exam" to the content management system 210.

In some implementations, a control may be presented (404) to a campaign sponsor to enable selection of a placement designation. For example, the targeting option provider 214 can provide an interface (e.g., the interface 230, the interface 300, or another suitable interface) including various options for targeting the content item 260a to system users (e.g., the user 204a). The targeting options, for example, may include options for indicating one or more placement designations for presenting a content item (e.g., the content item 260a) when presenting the content item via a content presentation interface (e.g., a search results page, such as the search page 250).

In some implementations, presenting the control may include presenting an option to allow for specification of presentation of content items only in a search suggestion control. Referring to FIG. 3, for example, the user interface 300 can include the control 324 for indicating that instances of a content item are to be presented within search suggestion controls to system users, and a control 334 for providing a preview of how a particular content item (e.g., the content item 260a) would appear when presented within the search suggestion control. If a campaign sponsor representative (e.g., the user 204a) were to interact with (e.g., select) the control 324 and were not to interact with either of the controls 320, 322, for example, the content management system 210 may interpret such actions as a directive to generate instances of a content item (e.g., the content item 260a) in a format suitable for placement in search suggestion controls, and to place the content item instances in search suggestion controls only.

In some implementations, presenting the control may include presenting an option to allow for specification of presentation of content items in either a search suggestion control or as part of search results submitted to a user. Referring again to FIG. 3, for example, the user interface 300 can include the control 320 for indicating that content items are to be presented within a top portion of a content presentation interface to system users, and the control 322 for indicating that content items are to be presented within a side portion of the content presentation interface. For example, a content presentation such as a search results page submitted to a user in response to a received search string may include one or more sponsored search results placed on the page (e.g., at the top, bottom, right side, left side, etc.). In the present example, if a campaign sponsor representative (e.g., the user 204a) were to interact with (e.g., select) both the control 320 and the control 324, the content management system 210 may interpret such actions as a directive to generate instances of a content item (e.g., the content item 260a) in formats suitable for placement as part of search results submitted to a system user (e.g., the user 204b) and/or to generate content item instances suitable for placement in search suggestion controls. Content item instances that are suitable for placement in search suggestion controls can be placed in such controls, for example, and content item instances that are suitable for inclusion in search results can be thus included.

An indication can be received (406) of a placement designation including targeting criteria for the presentation of the content item. For example, the designation receiver 216 can receive indications of one or more placement designations provided by a campaign sponsor representative (e.g., the user 204a) via a user interface (e.g., an interface such as the interfaces 230, 300). The targeting criteria, for example, may include a designation for presenting a content item (e.g., the content item 260a) in a search suggestion control along with search suggestions, and may include one or more designations for presenting the content item in various other portions (e.g., top, bottom, right side, left side, etc.) of a content presentation interface.

Information associated with the campaign can be stored (408). Upon receiving targeting options and other campaign information via interfaces such as the interfaces 230, 300, for example, the content management system 210 can store the campaign information in the campaigns data store 222 for subsequent use.

Content requests can be processed (410). For example, the content management system 210 can use the content request processor 220 to process requests for content (e.g., search requests) submitted by system users (e.g., the user 204b), in conjunction with the computing server(s) 208b (i.e., the search system). Processing content requests may include evaluating a received search string, identifying one or more query suggestions, determining if the query suggestions match one or more terms associated with a campaign, and presenting a content item in response to the received search string along with the one or more query suggestions.

In the present example, a search string (e.g., the prefix "exa") can be provided by the system user 204b via the search control 252a included on the search page 250a. The computing server(s) 208b (the search system), for example, can receive the search string. In some implementations, the search system may identify one or more search suggestions (e.g., "example", "example cover", "example of data", etc.) for the search string. For example, search data 254 including the search string and/or search suggestions can be provided by the search system to the content management system 210. In some implementations, the content request processor 220 may identify one or more search suggestions for a received search string.

Upon receiving the search string and/or search suggestions, for example, the content request processor 220 can access the campaigns data store 222 and can determine whether search string and/or the query suggestions match one or more terms associated with a campaign. In the present example, the content request processor 220 may identify a match between the search suggestion "example" and the identified term "example".

Upon identifying a match, for example, the content request processor 220 can identify and/or generate a content item (e.g., the content item 260a) associated with a campaign of the campaign sponsor 240, and can identify an indication of a placement designation associated with the content item. In the present example, the content request processor 220 may access the campaigns data store 222 and may determine that a content item associated with the campaign sponsor 240 is to be presented in a search suggestion control along with search suggestions. The content request processor 220, for example, may identify and/or generate an instance of a content item that is suitable for presentation to the user 204b given the user's context (e.g., the user's profile and/or location, the type of client device 202b, the application for presenting the search page 250b, the placement designation, etc.). Upon identifying and/or generating the content item instance, for example, the content management system 210 may provide the instance (e.g., the content item 260a) to the computing server(s) 208b (the search system) for inclusion in a search suggestion control of a search page.

In some implementations, a bid may be received from a campaign sponsor, the bid may be associated with the one or more terms, and an auction may be run (412). For example, a representative of the campaign sponsor 240 may use an interface (e.g., the user interface 230, 300) to provide bid information. Referring to FIG. 3, for example, the representative may specify a bid via the control 340 for having content presented to users based on the submitted targeting selections (e.g., one or more terms, one or more placement designations, and other suitable selections). For example, the auction manager 218 may conduct an auction between various campaign sponsors who may have bid on having content presented in search suggestion controls to users having submitted the prefix "exa" and/or users receiving the search suggestion "example". During the auction, for example, the content management system 210 can evaluate bids and associated quality scores for each campaign, and can determine one or more auction winners. Quality scores, for example, may be based on historical click rates of content items, campaigns, and/or campaign sponsors, and other suitable factors.

Upon receiving the content item 260a, for example, the computing server(s) 208b (the search system) can include the content item (shown here as content item 260b) in the search suggestion control 270 included in the search page 250b, along with search completions 272 (e.g., query suggestions for the prefix "exa", such as "example", "example cover", "example of data", etc.). Thus, for example, campaign sponsors may target content items (e.g., sponsored search suggestions) to be presented along with potential search completions in a search suggestion control. Potential applications may include search suggestion interfaces for web searches, map searches, video searches, product searches, and other search types.

Figure 5:
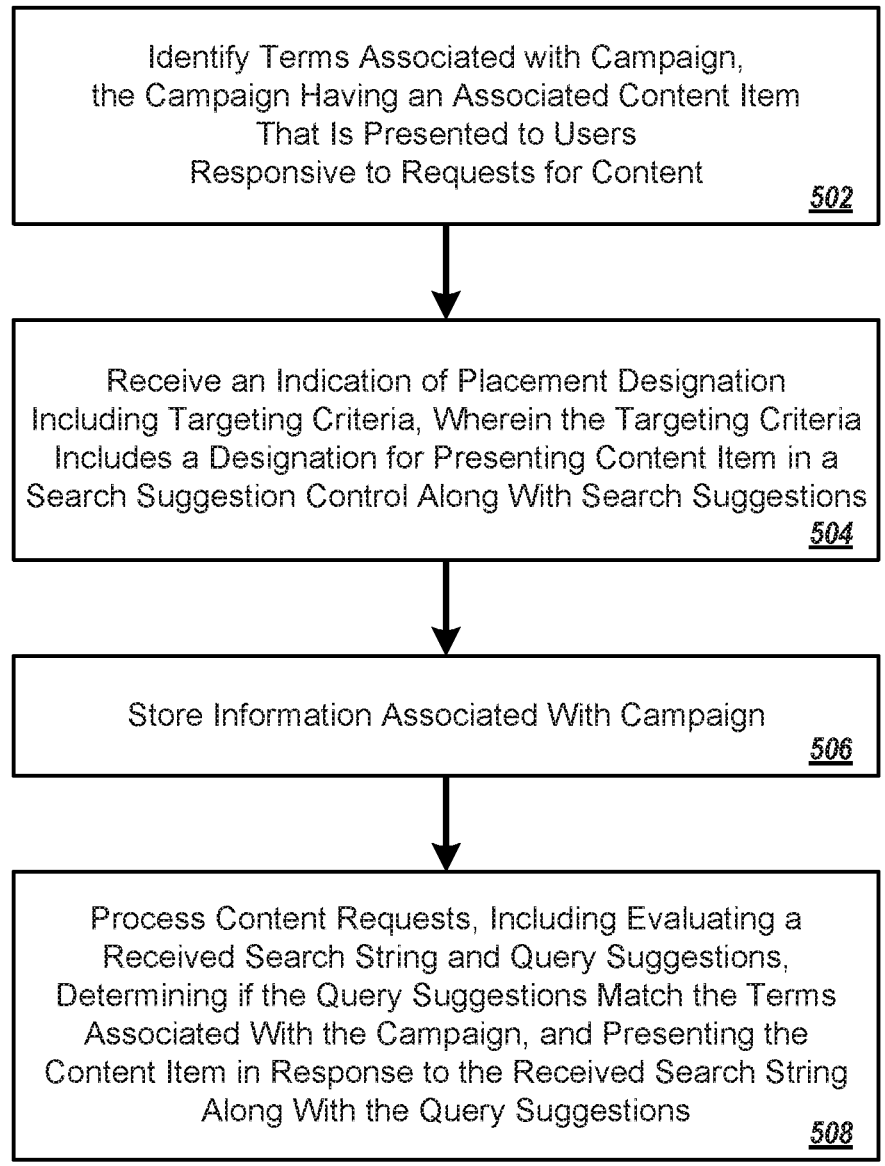

FIG. 5 is a flowchart of an example process 500 for presenting content items in accordance with a received placement designation. In some implementations, the process 500 may be performed by the systems 100 and/or 200, and will be described as such for the purpose of clarity. Briefly, the process 500 may include identifying terms associated with a campaign, receiving an indication of a placement designation including targeting criteria, wherein the targeting criteria includes a designation for presenting a content item in a search suggestion control along with search suggestions, storing information associated with the campaign, and processing content requests. Processing requests for content may include evaluating a received search string and query suggestions, determining if the query suggestions match the terms associated with the campaign, and presenting the content item in response to the received search string along with the query suggestions.

One or more terms associated with a campaign can be identified (502). Referring to FIG. 2, for example, the term identifier 212 can identify one or more terms associated with a campaign (e.g., an advertising campaign) of the campaign sponsor 240. In the present example, the campaign sponsor 240 may have an ongoing campaign for presenting content items (e.g., the content item 260a) to users responsive to requests for content (e.g., search strings) provided by users. In some implementations, one or more terms may be received from a campaign sponsor. For example, a representative (e.g., the user 204a) of the campaign sponsor 240 may employ the interface 230b to provide one or more campaign terms to the content management system 210. In some implementations, the one or more terms may include one or more prefixes which may include the first one or more letters of the terms. For example, the campaign sponsor 240 may provide a term and/or one or more term prefixes to the content management system 210.

In some implementations, a control may be presented to a campaign sponsor to enable selection of a placement designation. For example, the targeting option provider 214 can provide an interface (e.g., the interface 230, the interface 300, or another suitable interface) including various options for targeting the content item 260a to system users (e.g., the user 204a). The targeting options, for example, may include options for indicating one or more placement designations for presenting a content item (e.g., the content item 260a) when presenting the content item via a content presentation interface (e.g., a search results page, such as the search page 250).

An indication can be received (504) of a placement designation including targeting criteria for the presentation of the content item. For example, the designation receiver 216 can receive indications of one or more placement designations provided by a campaign sponsor representative (e.g., the user 204a) via a user interface (e.g., an interface such as the interfaces 230, 300). The targeting criteria, for example, may include a designation for presenting a content item (e.g., the content item 260a) in a search suggestion control along with search suggestions, and may include one or more designations for presenting the content item in various other portions (e.g., top, bottom, right side, left side, etc.) of a content presentation interface.

Information associated with the campaign can be stored (506). Upon receiving targeting options and other campaign information via interfaces such as the interfaces 230, 300, for example, the content management system 210 can store the campaign information in the campaigns data store 222 for subsequent use.

Content requests can be processed (508). For example, the content management system 210 can use the content request processor 220 to process requests for content (e.g., search requests) submitted by system users (e.g., the user 204b), in conjunction with the computing server(s) 208b (i.e., the search system). Processing content requests may include evaluating a received search string and one or more query suggestions, determining if the search string or the query suggestions match one or more terms associated with a campaign, and presenting a content item in response to the received search string along with the one or more query suggestions.

In the present example, a search string (e.g., the prefix "exa") can be provided by the system user 204b via the search control 252a included on the search page 250a. The computing server(s) 208b (the search system), for example, can receive the search string, and can identify one or more search suggestions (e.g., "example", "example cover", "example of data", etc.) for the search string. In the present example, search data 254 including the search string and the search suggestions can be provided to the content management system 210. Upon receiving the search string and the search suggestions, for example, the content request processor 220 can access the campaigns data store 222 and can determine whether search string or the query suggestions match one or more terms associated with a campaign. In the present example, the content request processor 220 may identify a match between the search suggestion "example" and the identified term "example".

Upon identifying a match, for example, the content request processor 220 can identify and/or generate a content item (e.g., the content item 260a) associated with a campaign of the campaign sponsor 240, and can identify an indication of a placement designation associated with the content item. In the present example, the content request processor 220 may access the campaigns data store 222 and may determine that a content item associated with the campaign sponsor 240 is to be presented in a search suggestion control along with search suggestions. The content request processor 220, for example, may identify and/or generate an instance of a content item that is suitable for presentation to the user 204b given the user's context. Upon identifying and/or generating the content item instance, for example, the content management system 210 may provide the instance (e.g., the content item 260a) to the computing server(s) 208b (the search system) for inclusion in a search suggestion control of a search page. Upon receiving the content item 260a, for example, the computing server(s) 208b (the search system) can include the content item (shown here as content item 260b) in the search suggestion control 270 included in the search page 250b, along with search completions 272 (e.g., query suggestions for the prefix "exa", such as "example", "example cover", "example of data", etc.).

Figure 6:
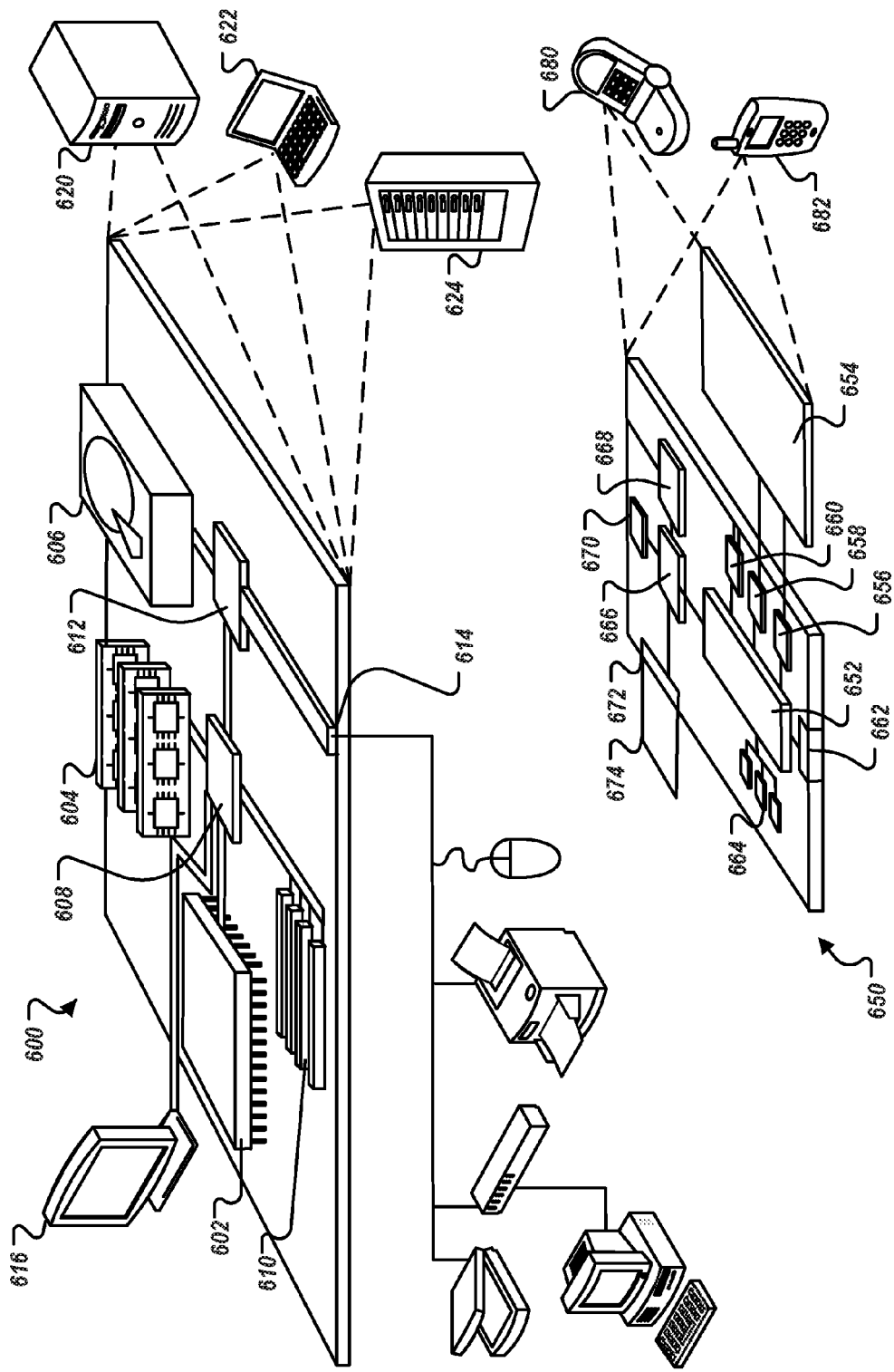
FIG. 6 shows an example of a computer device and a mobile computer device that can be used to implement the techniques described herein.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    updating a user interface presented at a client device of a content sponsor to present a placement designation control that enables the content sponsor to specify that a given content item is to be presented only in an inline search suggestion control;
    receiving, through interaction with the placement designation control, an indication that the content item is to be presented in the inline search suggestion control along with search suggestions for completing a partial form of a search string, wherein the search suggestions for completing the partial form of the search string are different from search results for a given search suggestion;
    storing information related to the indication in association with the content item;
    determining that presentation of the inline search suggestion control has been triggered by entry of a given partial form of the search string entered into a search control presented at a user device; and
    dynamically updating the inline search suggestion control to include a presentation of the content item in the inline search suggestion control, along with one or more search suggestions, wherein the dynamic update is performed in response to entry of the given partial form of the search string and the stored association between the indication and the content item.

2. The computer-implemented method of claim 1, further comprising updating the user interface presented at the client device of the content sponsor to present a term selection control that enables the content sponsor to specify one or more partial forms of the search string, wherein storing information related to the indication includes storing information that associates the content item with the one or more partial forms of the search string.

3. The computer-implemented method of claim 2, further comprising updating the user interface presented at the client device of the content sponsor to present estimated reach information for each of the one or more partial forms of the search string.

4. The computer-implemented method of claim 1, further comprising updating the user interface presented at the client device of the content sponsor to present one or more content item specification controls that enable the content sponsor to specify one or more aspects of the content item.

5. The computer-implemented method of claim 4, wherein the one or more aspects of the content item include one or more of a headline, a description, a web link, or a graphic.

6. The computer-implemented method of claim 4, wherein at least one of the content item specification controls enables the content sponsor to upload a graphical icon.

7. The computer-implemented method of claim 4, wherein at least one of the content item specification controls enables the content sponsor to create a graphical icon.

8. The computer-implemented method of claim 1, wherein dynamically updating the inline search suggestion control includes providing a visual distinction between the content item and the one or more search suggestions.

9. The computer-implemented method of claim 8, wherein the visual distinction between the content item and the one or more suggestions is a boundary line.

10. The computer-implemented method of claim 1, wherein dynamically updating the inline search suggestion control includes highlighting the entered given partial form of the search string within text of the content item.

11. A non-transitory computer storage medium encoded with instructions that when executed by one or more computers cause the one or more computers to perform operations comprising:
    updating a user interface presented at a client device of a content sponsor to present a placement designation control that enables the content sponsor to specify that a given content item is to be presented only in an inline search suggestion control;
    receiving, through interaction with the placement designation control, an indication that the content item is to be presented in the inline search suggestion control along with search suggestions for completing a partial form of a search string, wherein the search suggestions for completing the partial form of the search string are different from search results for a given search suggestion;
    storing information related to the indication in association with the content item;
    determining that presentation of the inline search suggestion control has been triggered by entry of a given partial form of the search string entered into a search control presented at a user device; and
    dynamically updating the inline search suggestion control to include a presentation of the content item in the inline search suggestion control, along with one or more search suggestions, wherein the dynamic update is performed in response to entry of the given partial form of the search string and the stored association between the indication and the content item.

12. The non-transitory computer storage medium of claim 11, the operations further comprising updating the user interface presented at the client device of the content sponsor to present a term selection control that enables the content sponsor to specify one or more partial forms of the search string, wherein storing information related to the indication includes storing information that associates the content item with the one or more partial forms of the search string.

13. The non-transitory computer storage medium of claim 11, the operations further comprising updating the user interface presented at the client device of the content sponsor to present one or more content item specification controls that enable the content sponsor to specify one or more aspects of the content item.

14. The non-transitory computer storage medium of claim 11, wherein dynamically updating the inline search suggestion control includes providing a visual distinction between the content item and the one or more search suggestions.

15. The non-transitory computer storage medium of claim 11, wherein dynamically updating the inline search suggestion control includes highlighting the entered given partial form of the search string within text of the content item.

16. A system comprising:
    one or more processors; and
    one or more memory elements including instructions that, when executed, cause the one or more processors to perform operations comprising:
    updating a user interface presented at a client device of a content sponsor to present a placement designation control that enables the content sponsor to specify that a given content item is to be presented only in an inline search suggestion control;

receiving, through interaction with the placement designation control, an indication that the content item is to be presented in the inline search suggestion control along with search suggestions for completing a partial form of a search string, wherein the search suggestions for completing the partial form of the search string are different from search results for a given search suggestion;

storing information related to the indication in association with the content item;

determining that presentation of the inline search suggestion control has been triggered by entry of a given partial form of the search string entered into a search control presented at a user device; and dynamically updating the inline search suggestion control to include a presentation of the content item in the inline search suggestion control, along with one or more search suggestions, wherein the dynamic update is performed in response to entry of the given partial form of the search string and the stored association between the indication and the content item.

17. The system of claim 16, the operations further comprising updating the user interface presented at the client device of the content sponsor to present a term selection control that enables the content sponsor to specify one or more partial forms of the search string, wherein storing information related to the indication includes storing information that associates the content item with the one or more partial forms of the search string.

18. The system of claim 16, the operations further comprising updating the user interface presented at the client device of the content sponsor to present one or more content item specification controls that enable the content sponsor to specify one or more aspects of the content item.

19. The system of claim 16, wherein dynamically updating the inline search suggestion control includes providing a visual distinction between the content item and the one or more search suggestions.

20. The system of claim 16, wherein dynamically updating the inline search suggestion control includes highlighting the entered given partial form of the search string within text of the content item.

* * * * *